July 31, 1923.
F. YOUNGER
1,463,415
SANITARY DISPENSING APPARATUS
Filed July 15, 1921
3 Sheets-Sheet 2
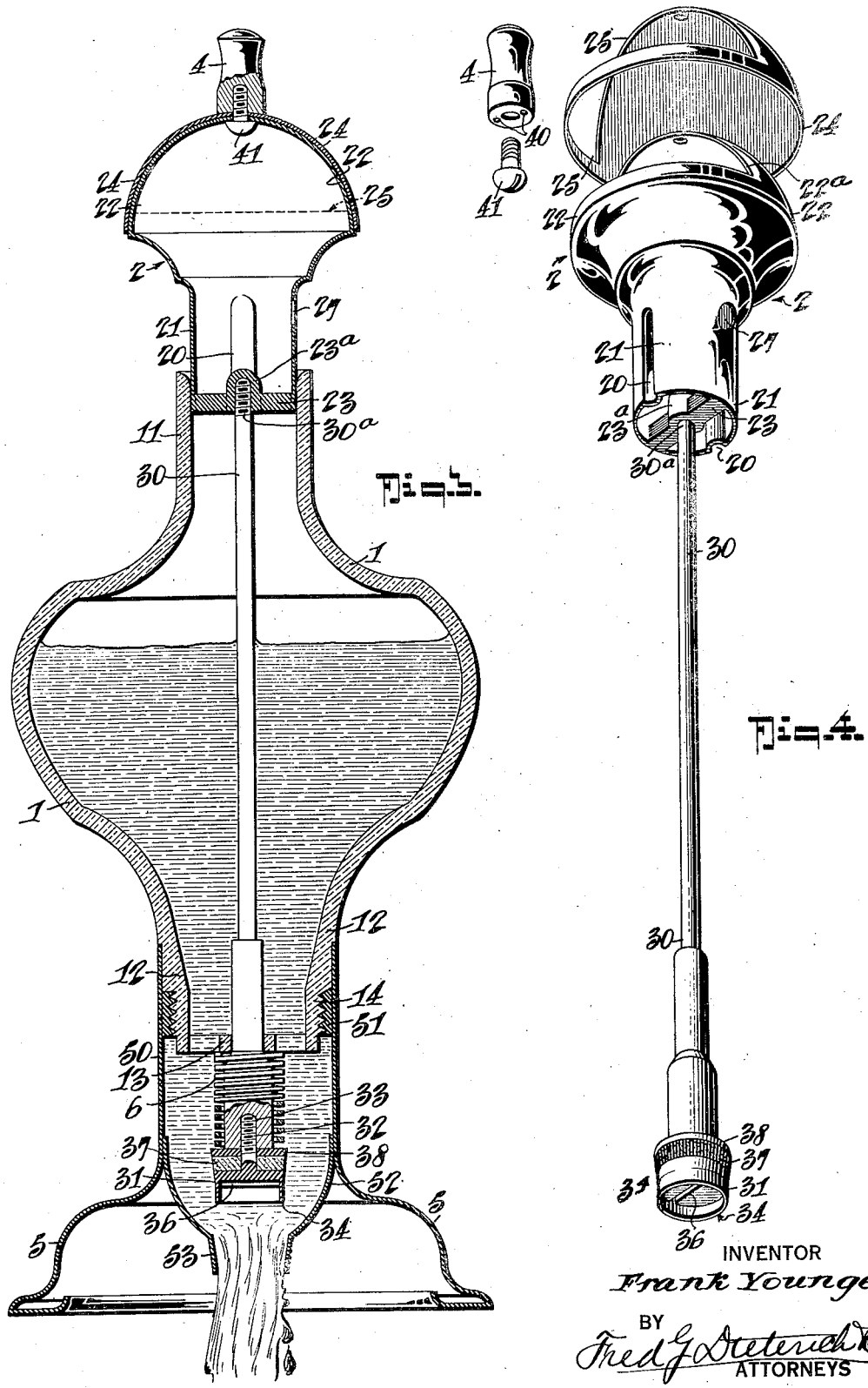
INVENTOR
Frank Younger.
BY
Fred J. Dieterich
ATTORNEYS July 31, 1923.
F. YOUNGER
1,463,415
SANITARY DISPENSING APPARATUS
Filed July 15, 1921
3 Sheets-Sheet 3
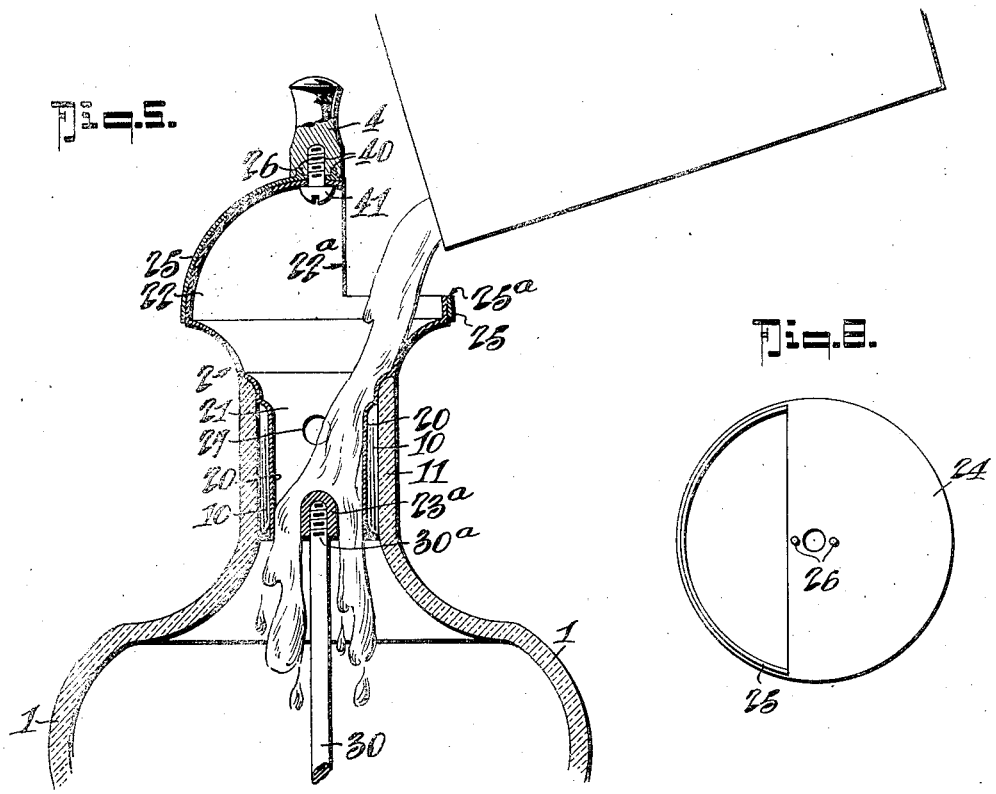
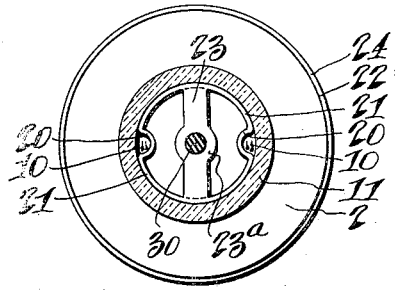
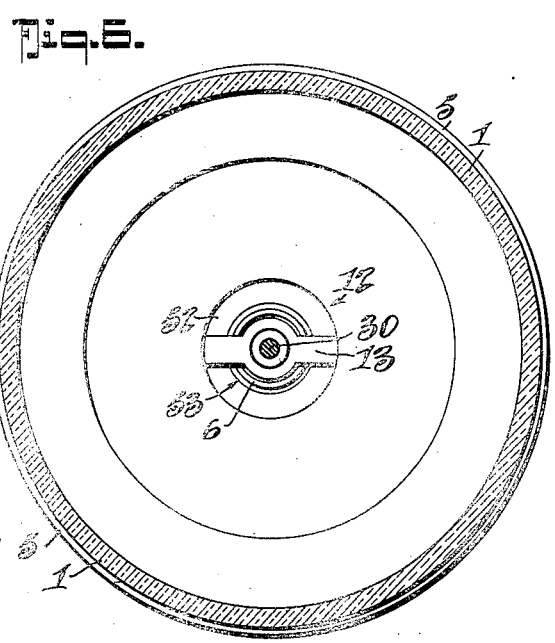
INVENTOR
*Frank Younger*
BY
*Fred G. Dieterich*
ATTORNEYS

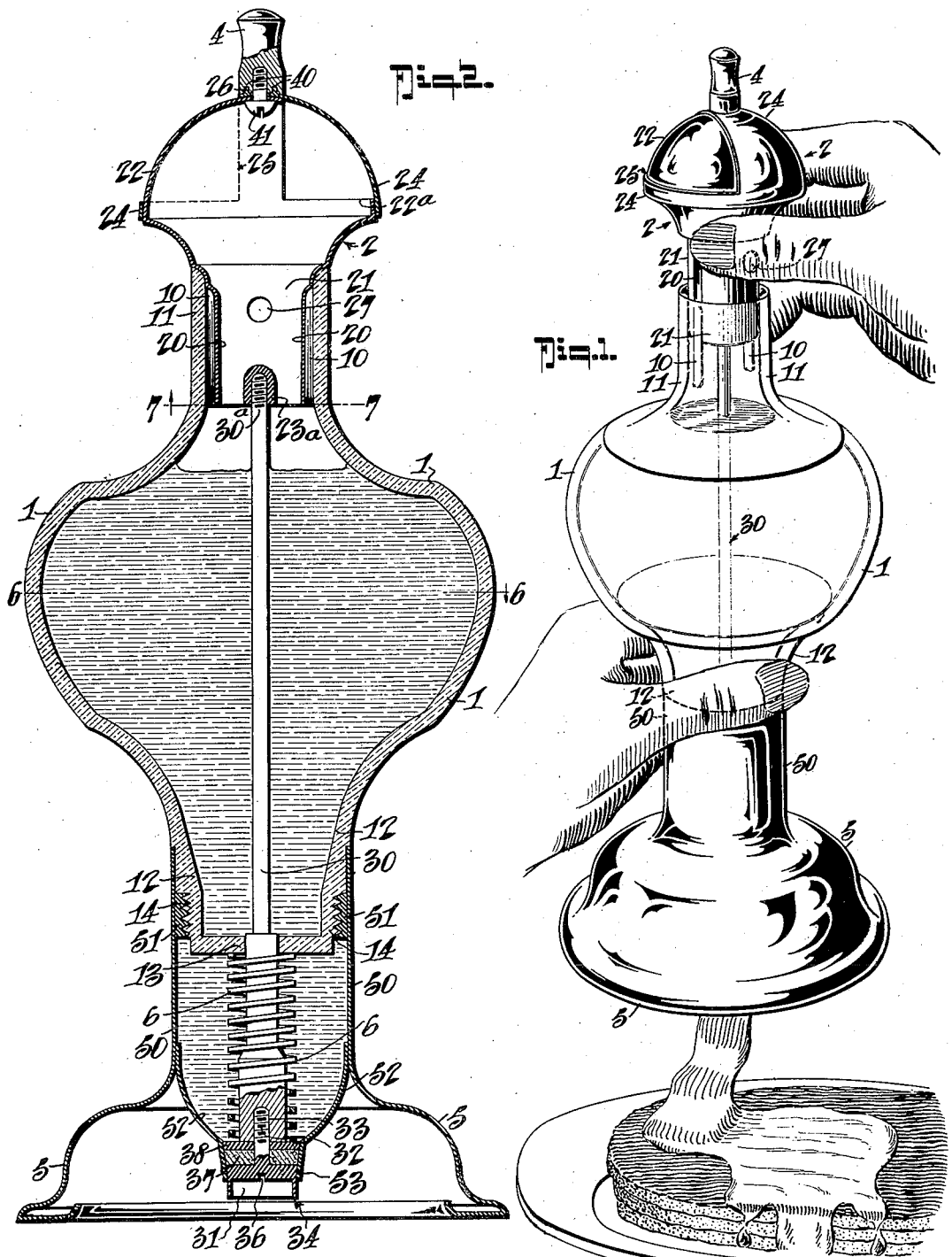

Patented July 31, 1923.

1,463,415

UNITED STATES PATENT OFFICE.

FRANK YOUNGER, OF WALLACE, CALIFORNIA.

SANITARY DISPENSING APPARATUS.

Application filed July 15, 1921. Serial No. 485,019.

*To all whom it may concern:*

Be it known that I, FRANK YOUNGER, residing at Wallace, in the county of Calaveras and State of California, have invented a new and Improved Sanitary Dispensing Apparatus, of which the following is a specification.

This invention has reference to improvements in sanitary dispensing apparatus and is especially designed for dispensing liquid commodities, such as syrup, honey, and the like, in an absolutely sanitary manner and in such small quantities as is usually required in connection with dining tables.

My present invention, which has special reference to the type of dispensing apparatus disclosed in my Patent No. 1,295,665, dated February 25, 1919, primarily has for its purpose to provide a dispensing means of the general character outlined in my patent aforesaid, of a relatively economical construction, which is adapted for being conveniently handled and having improved valve devices that operate for cutting off the flow of the liquid or commodity from the container of such apparatus, in a clean, quick and effective manner.

Again my invention comprehends a syrup dispensing appliance in which the operation of delivering the desired quantity from the container and for causing the stoppage of the said liquid commodity with a clean cutoff of such commodity, at the outlet, is completely under the control of the user.

In its more complete nature, my present invention comprehends an improved construction and arrangement of the parts that constitute my present dispensing appliance which are individually so designed and adapted for being cooperatively assembled for use and readily taken apart, when it is desired to effect the universal cleaning of the device or for replacing new parts.

With the above objects in view, and other minor objects that will hereinafter be apparent, my present invention comprehends an improved food dispensing appliance or table accessory which embodies the peculiar features of construction and combination of parts, all of which will be described in the following detailed description, specifically set out in the appended claims and illustrated in the accompanying drawings, in which:—

Figure 1 is a perspective view of my invention showing the manner of operating the same for discharging its contents.

Figure 2 is a vertical longitudinal section of the appliance and illustrates the valve closed-contents cutoff position.

Figure 3 is a view similar to Figure 2, taken at right angles thereto and illustrating the valve opened-contents dispensing position.

Figure 4 is a detail perspective view of the valve member and its cooperative combined lifting and filler head, parts of the head being shown as separated.

Figure 5 is a detail vertical section of the upper portion of the appliance and illustrating the manner in which the contents are fed thereinto.

Figure 6 is a horizontal section taken on the line 6—6 of Figure 2.

Figure 7 is a similar view taken on the line 7—7 on Figure 2.

Figure 8 is a detail plan view of the closure cap portion of the filler head member or valve lifter.

My present invention which, as before noted, more particularly relates to a table accessory for dispensing food commodities, and which embodies the general features of construction disclosed in my patent aforesaid, is more especially designed as an appliance of the type mentioned, whose primary purpose is to provide means for holding and delivering, in a sanitary and clean manner, a relatively small portion of the contents of the holder by a new and ingenious way without the need or use of a second utensil, such as a saucer or other means heretofore used with the dispensing of syrup or like commodities, and by which is ensured a clean delivery of the quantities desired for table use, of commodities of a sticky nature, which tend to adhere to the utensils from which they are usually delivered.

While I shall describe my present construction of dispensing appliance as especially adapted for delivering small quantities of syrup or honey, and especially useful as a table accessory for the home, hotels, lunch rooms, and other places where syrup and honey are used, it is to be understood that without any material changes of the parts, my present dispensing appliance may be readily adapted for dispensing liquids other than those of a sticky nature, as stated.

In the present development of my invention, 1 designates the body or holder which may be of any desired material, but preferably of glass, as shown in the drawings, due to its cheapness of structure and transparency, so that the contents thereof may be readily ascertained.

The body 1 includes a vertical extension or neck that is formed with a plurality, preferably two, of diametrically oppositely disposed vertical ribs 10, whose purpose is to engage with vertically extended grooves 20 in the pendent or sleeve portion 21 of a head member, hereinafter termed "lifter head 2," as is best shown in Figure 4, and to secure the said head 2 from turning when the parts are adjusted to their closed or non-dispensing position, as shown in Figure 2, or at the dispensing position, as at Figure 3, and for other reasons presently explained.

The lifter head 2, referred to, in my present construction, includes a semi-spherical member 22 shaped up in any suitable manner from a sheet metal blank with the circular or pendent portion 21, the latter being of a diameter to snugly fit and have vertical movement in the member or neck end 11 of the glass body 1.

The bottom of the pendent end 21 of the lifter head is open and has a bridge which includes a central hub 23 provided with an internally threaded socket 23ª into which is received the upper threaded end 30ª of the rod 30 of the valve devices, the specific construction of which constitutes an essential feature of my present invention and which will be presently described in detail. The pendent portion 21 also has an aperture 27 near the top, the purpose of which will be hereinafter stated.

The spherical portion 22 of the lifter head 2, at one side has a substantially semi-circular filling opening 22ª through which the syrup, or other like liquid substance, is poured when filling the appliance, as is clearly indicated in Figure 5.

Cooperative with the head member 22 is a semi-spherical metal closure or cover 24 which is spun or otherwise shaped for snugly fitting over the head member 22.

The cover 24 has an opening 25 adapted for being turned into register with the filling opening 22ª of the head member 22 when it is desired to supply the holder and for being moved sidewise out of register with such opening 22ª when the appliance is filled and ready for use.

To provide for conveniently turning the cover 24 to its open or filling adjustment and to close the opening 25 the said cover has a finger knob 4, which is held firmly seated upon the cover by the nibs 26 punched up from the cover 24 and which enter suitable recesses 40 in the bottom of the knob 4, which latter is secured to the lifter head by the screw 41 that passes up through apertures in the members 22—24 and enters a threaded socket in the knob, the screw serving to hold the head members 22 and 24 in sufficient frictional contact to keep the said parts closed, dust-proof.

The holder 1, in my present construction of dispensing appliance, has its lower end restricted to a funnel shape, as at 12, and its extreme lower edge is provided with a bridge member having a central bearing 13 for the lower end of the valve rod 30, the said end of the holder being also provided with a threaded boss 14 by which the holder is connected to the standard or base section, which latter, in my present invention, is suitably formed of spun metal and includes a base member 5 and a restricted tubular vertical shank 50 that is provided with an internal screw member 51 for engaging the threaded boss 14 of the holder 1, as is clearly shown in Figures 2 and 3.

52 designates a bowl shaped bottom, which is fixedly held within the lower end of the shank 50 and it has a central pendent tubular extension 53 which constitutes the passage through which the contents of the holder 1 are delivered and which also constitutes the seat for the valve 3.

By referring now more particularly to Figures 3 and 4 of the drawings, in which the valve and valve seat construction is clearly shown, the valve, generally designated 3, comprises an inverted cup shaped metal body 31 having a screw shank 32 for threading into a screw socket 33 in the lower or head end of the valve rod 31.

37 designates a washer of rubber or other yieldable material and the said washer is mounted on the valve stem 33. The said washer serves as a packing means since it effectively extends against the beveled wall of the discharge 53 when the valve is at the down or closure position indicated in Figure 2. 38 designates a metal disk washer mounted around the valve stem 33 and the said disk serves to hold the rubber washer 37 in rigid position and it also constitutes a base or rim flange for the spring 6, as is clearly shown in Figure 2.

It will be noticed from Figure 3, the tubular extension or valve seat portion 53 of the bowl 52 tapers inwardly, that is,—the internal chamber of the extension 53 gradually decreases toward the discharge end, where the diameter is that of the straight outer or cutting edge 34 of the flange 31, the reason for which will presently appear.

As is well known, syrups and other like liquids flow slowly and owing to their sticky nature, adhere to the surface over which they pass. To provide for an effective closure as the valve is caused to descend under hand pressure on the plunger head, and at the same time provide for the self-cleaning of the valve and its seat, the annular pendent flange 31 of the valve is formed of thin metal, preferably steel of 1/32 of an inch or less in thickness, the hollow of the said projection offering a convenient means for securing the valve parts together by the simple application of a screw driver into the slot 36 of the valve member, as is shown.

As before noted, the valve includes a pendent annular cutting flange 31, in practice, of very thin steel, of uniform diameter with that of the most restricted diameter of the outflow passage in the valve seat 53.

The parts mentioned are so combined that when the cutoff devices for the outflow passage 53 is at the closed position the said flange 31 will have passed entirely through and below the passage 53 and thereby permit of a clean fitting of the valve body member, within the seat 53, as is clearly shown in Figure 2, the part 31 of the valve devices functioning only as a means for effecting a clean cutoff of the viscid substance and the cleaning of the seat 53 from the said sticky adhering substance as the valve proper approaches its seating position.

*Operation.*

Assuming that the several parts of the device are wholly separated, as would be the case when a thorough cleaning thereof has just been effected, the filler or lifter head and the valve rod and valve devices thereto attached would be as shown in Figure 4, and the glass bowl member or holder 1 would be unscrewed, that is, separated from the base member 5.

The container or holder and the base member 5 would be properly assembled and the said parts operatively joined together, as shown in Figure 3, such parts now being ready to be filled with the commodity to be dispensed. After the appliance has been filled in the manner indicated in Figure 5, the cover member 24, through proper manipulation of the knob 4, is rotated to bring its opening 22$^a$ up to register with the opening 22 in the head 2, to positively close the said opening 22 in the said head, the parts being now adjusted as clearly shown in Figure 2, and the appliance or apparatus is ready for use.

Now, one wishing to use the appliance or device would grasp the shank of the holder with one hand and grip the lifter head with the other hand, in the manner clearly illustrated in Figure 1, from which it will be noticed the restricted portion 50 of the base that constitutes the shank of the holder is designed to form an excellent handle.

To dispense a desired quantity of the contents of the apparatus or appliance, the user lifts the head 2, as shown and thereby lifts the valve 21 against the tension of its return spring 6 until the said valve is raised some distance above its seat 53, to provide for a clean outflow of the syrup in the manner clearly shown in Figure 3 of the drawing, it being apparent, by referring to the said Figure 3, while grasping the device, as shown, the user can easily move it over the dish for spreading the flowing syrup, as desired.

It should be mentioned the aperture 27 in the pendent portion 21 of the lifter head 22 is so positioned that when the parts are held as in Figures 1 and 3, it constitutes an air vent for the passage of air into the holder to provide for the ready outflow of the fluid contents through the bottom passage, it being also obvious that when the lifter devices, that control the opening of the valve passage 53 (the closure of which is automatically effected by the plunger spring 6), the said vent opening 27 comes down within the neck of the holder 1 and is closed air and dust tight.

When the desired amount of the commodity has been dispensed, the user, by releasing the hold on the head member 2, allows the spring 6 to function, which quickly returns the valve 31 under plunger action, to its seat 53 and by reason of the peculiar shape of the valve seat 53 and the valve, the flow of the contents is positively cut off by the cutting action of the valve edge 34 and in such manner that there is no danger of leaking. Furthermore, owing to the peculiar shape of the valve and its seat, no drippings can possibly adhere to either the valve face or the seat, thereby making the device an absolutely sanitary one, since drippings are not likely to drop from the bottom of the device onto the table cloth nor particles of the dispensed contents remain hanging to the valve and its seat, the valve devices operating to give a clean cut discharge,—the valve devices, as it were, being self-cleaning.

The specific arrangement of the parts as shown and described present a practical embodiment of my invention, it being obvious that the said details may be modified to suit the particular character of the substance to be dispensed.

It is to be noted that in my present construction of dispensing appliance the operation of dispensing the contents is reversed to that required in my patented apparatus, hereinbefore referred to, in that the operation of dispensing is accomplished by a plunger action, that is,—pushing the valve devices below the outflow passage or valve seat, whereas in my present construction the operation of dispensing is effected under a lifting action of the valve, a condition which I have found necessary in the dispensing of viscid, syrupy liquids.

What I claim is:

1. In a dispensing apparatus of the class described, a container, a base section including a vertical tubular extension provided with an internal funnel shaped member which constitutes the bottom for the container, the said member having a tapering outflow passage that constitutes a valve seat, means for coupling the container and the tubular extension of the base, the said container including a restricted neck, a normally closing plunger valve engaging the valve seat, a valve lifter device that includes a head having a hollow shank that closely fits and has vertical movement within the container neck, the head constituting a finger grip for raising the valve from the valve seat to open the passage and a plunger for returning the valve to the closed position when the lifter device is released.

2. In a dispensing apparatus of the class described, a container, a base section including a vertical tubular extension provided with an internal funnel shaped member which constitutes the bottom for the container, the said member having a tapering outflow passage that constitutes a valve seat, means for coupling the container and the tubular extension of the base, the said container including a restricted neck, a normally closing plunger valve engaging the valve seat, a valve lifter device that includes a head having a hollow shank that closely fits and has vertical movement within the container neck, the head constituting a finger grip for raising the valve from the valve seat to open the passage, a plunger for returning the valve to the closed position when the lifter device is released, the said valve including a cutting element on its under face that clears the valve passage and serves as a severing element for cutting off the flow of the commodity dispensed.

3. A dispensing apparatus of the class described comprising a container having a tubular neck and a tapering lower end, a base section including a tubular vertical extension, a screw connection that joins the said extension with the lower end of the container, the tubular extension including a funnel shaped bottom having a contents discharging tapered passage that constitutes a valve seat, a lifting device, a valve on the lower end thereof, the said valve and lifting device being insertable through the container neck, a plunger spring device cooperative with the lifter for normally forcing the valve down into the seat to close the discharge, the said lifter device including a hollow head, said head having a hollow shank that closely fits the container neck and has movement vertically within the neck, the head of the lifter device having a filling opening and a cover cooperative with the head for closing the said opening.

4. A dispensing apparatus of the class described comprising a container having a tubular neck and a tapering lower end, a base section including a tubular vertical extension, a screw connection that joins the said extension with the lower end of the container, the tubular extension including a funnel shaped bottom having a condensing discharging tapered passage that constitutes a valve seat, a lifting device, a valve on the lower end thereof, the said valve and lifter devices being insertable through through the container neck, a plunger spring device cooperative with the lifter for normally forcing the valve down into the seat to close the discharge, the said lifter device including a hollow head, said head having a hollow shank that closely fits the container neck and has movement vertically within the neck, the head of the lifter device having a filling opening, a cover cooperative with the head for closing the said opening, the said hollow shank and the container neck having operative connections whereby the lifter and the valve are held from rotation relatively to the container and the valve seat.

5. A dispensing apparatus of the class described comprising a container having a tubular neck and a tapering lower end, a base section including a tubular vertical extension, a screw connection that joins the said extension with the lower end of the container, the tubular extension including a funnel shaped bottom having a contents discharging tapered passage that constitutes a valve seat, a lifting device insertable through the container neck, a valve on the lower end thereof, a plunger spring device cooperative with the lifter for normally forcing the valve down into the seat to close the discharge, the said lifter device including a hollow head, said head having a hollow shank that closely fits the container neck and has movement vertically within the neck, the head of the lifter device having a filling opening, a cover cooperative with the head for closing the said opening, the valve including a pendent annular cutting flange that effects a clean cutoff of the container contents passing through the filled passage and valve seat and which is projected entirely through the said passage of the valve seat when the valve is held down under plunger action of the spring.

6. A dispensing apparatus of the class described comprising a container having a tubular neck and a tapering lower end, a base section including a tubular vertical extension, a screw connection that joins the said extension with the lower end of the container, the tubular extension including a funnel shaped bottom having a dispensing discharging tapered passage that constitutes a valve seat, a lifting device insertable through the container neck, a valve on the lower end thereof, a plunger spring device cooperative with the lifter for normally forcing the valve down into the seat to close the discharge, the said lifter device including a hollow head, said head having a hollow shank that closely fits the container neck and has movement vertically within the neck, the head of the lifter device having a filling opening, a cover cooperative with the head for closing the said opening, the said hollow shank and the container neck having operative connections whereby the lifter and the valve are held from rotation relatively to the container and the valve seat, the pendent hollow shank of the lifter having a vent aperture which opens to atmosphere when the valve is lifted to clear the outlet passage and which is closed to atmosphere when the valve and the lifter are automatically restored to the down or normal position.

7. In a dispensing device, the combination with a container having a tapered lower end and a base having a tubular extension, means for detachably coupling the said tubular extension to the tapering end of the container, a funnel shaped bottom within the tubular extension, the said bottom having a discharge passage that constitutes a valve seat; of a lifter device comprising a stem, a valve carried on the lower end thereof for controlling the discharge passage, the plunger spring cooperative with a lifter device and the container for normally forcing the lifter device and the valve to the discharge closing position, the said lifter device including a hollow head that extends above the container and a hollow shank that fits within and has vertical movement in the container neck, the said head having a cover closed filling opening, through which the commodity to be dispensed is poured into the container.

8. In a dispensing apparatus of the class described, the combination with the container having a restricted lower end provided with an external thread and a vertically extended upper or neck portion, a base member including a vertical tubular extension that is provided with an internal funnel shaped bottom which has a tapering annular discharge passage, that constitutes a valve seat, the tubular extension having a threaded upper member for coupling with the threaded lower end of the container, of an operating device consisting of a lifting stem, a valve on the lower end thereof, said valve including a metal disk having a threaded shank for screwing into the lower end of the stem and a pendent annular cutting flange, a hollow head detachably connected to the upper end of the stem, the said head having a cover closed filling opening and a hollow pendent shank that slidably engages the neck of the container, and a spring device cooperative with the stem and the container for normally forcing the valve to the outlet passage closing position.

9. In a dispensing apparatus of the class described, the combination with the container having a restricted lower end provided with an external thread and a vertically extended upper or neck portion, a base member including a vertical tubular extension that is provided with an internal funnel shaped bottom which has a tapering annular discharge passage, that constitutes a valve seat, the tubular extension having a threaded upper member for coupling with the threaded lower end of the container; of an operating device consisting of a lifting stem, a valve on the lower end thereof, said valve including a metal disk having a threaded shank for screwing into the lower end of the stem and a pendent annular cutting flange, a hollow head detachably connected to the upper end of the stem, the said head having a cover closed filling opening, a hollow pendent shank that slidably engages the neck of the container, the bottom of the container having a bridge, the valve having an annular seat around the stem and a spring disposed above the stem and seated between the seat on the valve and the bridge on the lower end of the container.

10. In a dispensing apparatus, a container having a top inlet and a bottom outlet that constitutes a valve seat, a spring closed reciprocable lifter device, means holding said device against rotation, a valve attached to the lower end of said device and normally held closed against the valve seat of the outlet, said lifter device including a body that constitutes a stopper for the top inlet of said container when said valve is closed and serves as a part to be grasped to lift said lifter device, all being arranged so that the container may be grasped in one hand while said stopper is grasped in the other hand, substantially as shown and described.

FRANK YOUNGER.